United States Patent [19]
Gilbert et al.

[11] Patent Number: 5,595,225
[45] Date of Patent: Jan. 21, 1997

[54] MECHANISM FOR ROTATING A TREE-FELLING IMPLEMENT AND TREE-FELLING IMPLEMENT THEREWITH

[75] Inventors: Sylvain Gilbert, 1641 boul. St-Dominique, Roberval Québec, Canada, G8H 2P1; Michel Taillon, St-Félicien, Canada

[73] Assignee: Sylvain Gilbert, Canada

[21] Appl. No.: 571,269

[22] Filed: Dec. 12, 1995

Related U.S. Application Data

[63] Continuation-in-part of Ser. No. 419,713, Apr. 10, 1995, Pat. No. 5,553,993.

[51] Int. Cl.$^6$ ............................. A01G 23/08; E02F 3/32
[52] U.S. Cl. ......................... 144/34.1; 74/25; 74/99 R; 144/4.1; 144/336; 414/680; 414/694; 414/695.7; 414/739
[58] Field of Search ..................... 144/4.1, 24.13, 144/34.1, 34.5, 335, 336, 338; 30/379.5; 414/680, 694, 695, 695.5, 695.7, 722, 724, 739; 74/20, 25, 37, 89, 99 R, 108, 109

[56] References Cited

U.S. PATENT DOCUMENTS

| | | |
|---|---|---|
| 2,681,739 | 6/1954 | Gokey . |
| 3,027,026 | 3/1962 | Couquet . |
| 3,081,891 | 3/1963 | Przybylski . |
| 3,197,049 | 7/1965 | Schwing . |
| 3,217,910 | 11/1965 | Waite . |
| 3,278,046 | 10/1966 | Shumaker . |
| 3,294,131 | 12/1966 | Larson ................................. 144/34.5 |
| 3,495,727 | 2/1970 | Long . |
| 3,550,794 | 12/1970 | Suverkrop . |
| 3,590,894 | 7/1971 | Boyd ..................................... 144/34.5 |
| 3,796,331 | 3/1974 | Dutton . |
| 3,840,132 | 10/1974 | Howells, Jr. et al. . |
| 4,134,505 | 1/1979 | Watanabe . |
| 5,074,740 | 12/1991 | Weigel . |

*Primary Examiner*—W. Donald Bray
*Attorney, Agent, or Firm*—Merchant, Gould, Smith, Edell, Welter & Schmidt

[57] ABSTRACT

The mechanism is used for rotating a tree-felling implement rotatably connected to a distal end of a boom of a logging vehicle by an implement pivot. The mechanism comprises a pinion coaxial with the implement pivot and fixed in rotation with reference to the distal end of the boom. Two longitudinally extending actuators are mounted on the frame. Both actuators are lying in the pinion plane. Each actuator is adjacent to the pinion on a respective side thereof, namely right and left, and bears a corresponding sprocket coplanar with the pinion plane and rotatably connected to their free end. To link the elements together, there is provided a chain in mesh with the sprockets and the pinion. The chain has ends rigidly attached to the frame of the implement. In use, the implement is rotated as the actuators are operated in opposite directions. The mechanism provides a simple and reliable construction for rotating a tree-felling implement that is capable of rotating the implement with reference to the boom plane in both directions and according to a wide range of angles.

4 Claims, 3 Drawing Sheets

5,595,225

MECHANISM FOR ROTATING A TREE-FELLING IMPLEMENT AND TREE-FELLING IMPLEMENT THEREWITH

RELATED APPLICATION

The present patent application is a continuation-in-part of U.S. patent application Ser. No. 08/419,713 filed on 10 Apr. 1995, now U.S. Pat. No. 5,553,993.

FIELD OF THE INVENTION

The present invention relates to a mechanism for rotating a tree-felling implement rotatably mounted at the distal end of the boom of a logging vehicle. The mechanism, the tree-felling implement, the boom and the logging vehicle form a tree-felling machine controlled by an operator and is to be used on logging sites.

BACKGROUND OF THE INVENTION

Tree-felling machines are used in mechanized tree harvesting for cutting down trees instead of using a manual chain saw. Each machine comprises a logging vehicle with a boom at the end of which is provided a tree-felling implement. In use, to cut down an adjacent tree, the operator moves the implement towards the base of the tree. The implement then grabs a trunk with a set of hydraulically actuated arms and cuts the trunk at the base with a saw or a felling shear. The trunk is laid down on the ground or in a truck afterwards. Some implements can also remove branches from the trunk while still grabbing it, otherwise branches may be removed by another machine or a manual chain saw, or even not be removed at all.

Because the boom is generally moving only in the vertical plane, the implement has to be able to rotate with reference to the boom plane so that it may grab an inclined or curved tree, or a tree laying on the ground. In conventional tree-felling machines, the implement is rotated by means of a single oblique hydraulic actuator having one end operatively attached to the boom and another end operatively attached directly to the implement. With such embodiment, the implement may not be rotated around its pivot according to a wide range of angles and this alters greatly the flexibility of the machine. In some situations, the operator may have to move the machine around the tree until a suitable angle is found, which may not be always possible because of the usually soft soil and all the obstacles in a logging site. This therefore lowers productivity and adds unnecessary wear to the machine parts.

SUMMARY OF THE INVENTION

The object of the present invention is to provide a simple and reliable mechanism for rotating a tree-felling implement, and a tree-felling implement with such mechanism. It is further an object of the present invention to provide a mechanism capable of rotating the implement with reference to the boom plane in both directions and according to a wide range of angles.

More particularly, the object of the present invention is to provide a mechanism for rotating a tree-felling implement, the tree-felling implement comprising a frame rotatably connectable to a distal end of a boom of a logging vehicle by an implement pivot, the boom generally defining a boom plane, the mechanism comprising:

a pinion coaxial with the implement pivot and fixed in rotation with reference to the distal end of the boom, the pinion generally defining a pinion plane;

two longitudinally extending actuators mounted on the frame and substantially lying in the pinion plane, each actuator being adjacent to the pinion on a respective side thereof;

DESCRIPTION OF A PREFERRED EMBODIMENT

Reference numerals

Figure 1:
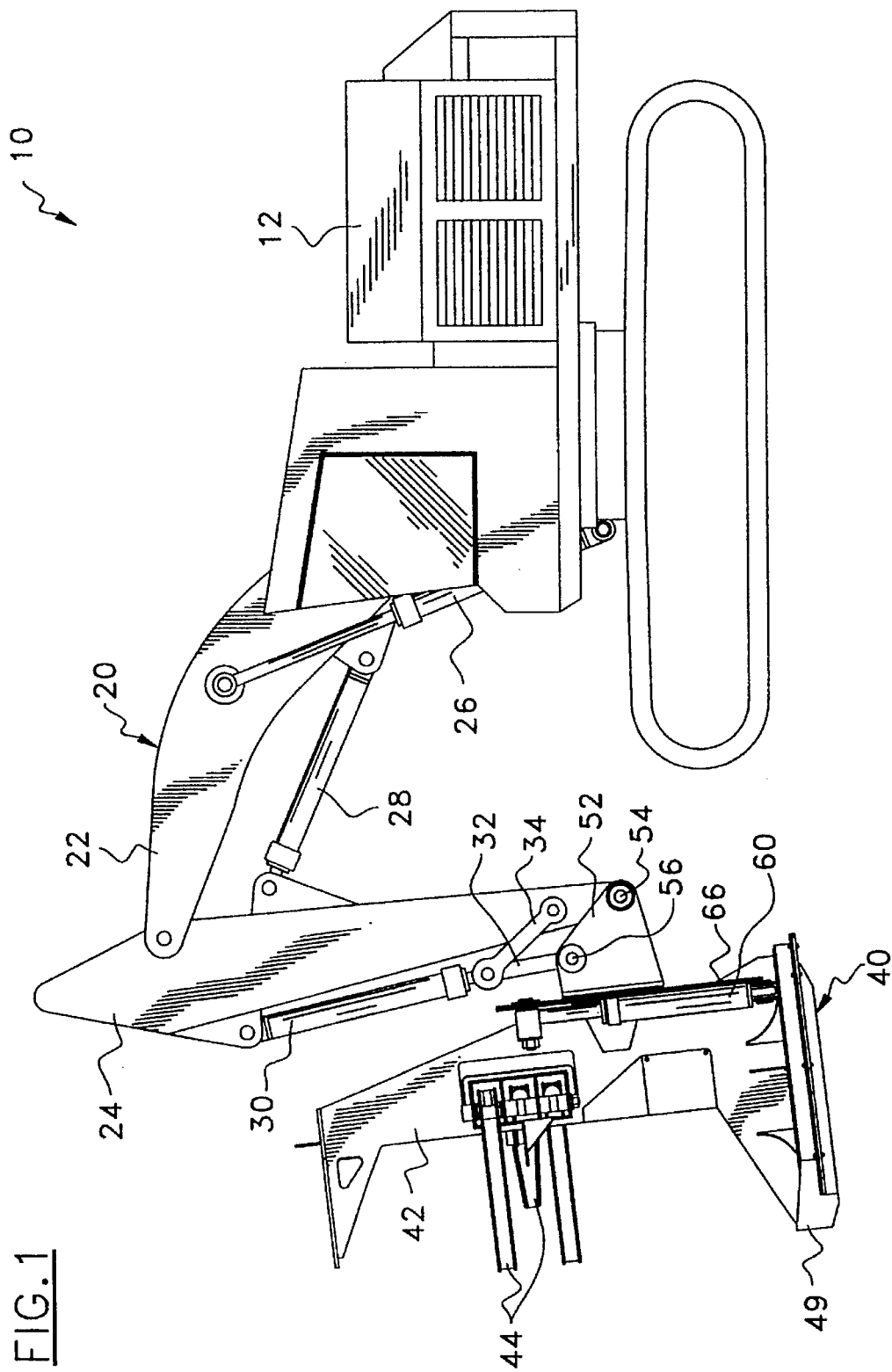
FIG. 1 is an elevational view of a logging vehicle with the tree-felling implement according to the preset invention.

The description and the drawings use the following reference numerals:

| | |
|---|---|
| 10 | tree-felling machine |
| 12 | logging vehicle |
| 14 | boom plane |
| 20 | boom |
| 22 | proximal boom member |
| 24 | distal boom member |
| 26 | boom hydraulic actuator |
| 28 | boom hydraulic actuator |
| 30 | boom hydraulic actuator |
| 32 | first lever |
| 34 | second lever |
| 40 | tree-felling implement |
| 42 | frame |
| 44 | trunk grabbing arms |
| 46 | hydraulic actuators (of the trunk grabbing arms) |
| 48 | circular saw |
| 49 | protective casing |
| 50 | implement pivot |
| 52 | linking element |
| 54 | first pivot (of the boom linking element) |
| 56 | second pivot (of the boom linking element) |
| 60 | actuators |
| 62 | pinion |
| 64 | sprockets |
| 66 | chain |

General description of the invention

As shown in FIG. 1, the tree-felling machine (10) comprises a self-propelled logging vehicle (12) adapted for use on logging sites and controlled by an operator sitting inside a cabin thereof. As apparent for a person skilled in the art, many other kinds of logging vehicles can be used instead of the one illustrated in FIG. 1.

An articulated boom (20) is operatively mounted on the vehicle (12). This boom (20) is known as a felling boom or a tree boom. Its purpose is to allow movement of a tree-felling implement (40) in the vertical plane. The implement (40) is rotatably connected at the distal end of the boom (20) by means of an implement pivot (50). The boom (20) is described in detail further in the text.

The tree-felling implement (40) is used for cutting down the trees instead of using a manual chain saw. In use, to cut down an adjacent tree, the operator moves the implement (40) towards the base of the tree. The implement (40) then grabs a trunk with a set of hydraulically actuated trunk grabbing arms (44) and cuts the trunk at the base with a circular saw (48). Alternatively, a felling shear (not shown) may be used. The trunk is laid down on the ground or in a truck afterwards. The implement (40) is described in detail further in the text.

Because the boom (20) is generally moving only in the vertical plane, hereinafter referred to as "the boom plane (14)", the implement (50) has to be able to rotate around the implement pivot (50) so that it may grab an inclined or curved tree, or a tree laying on the ground. The present invention provides a simple and reliable mechanism (60) capable of rotating the implement (40) with reference to the boom plane (14) in both directions, clockwise and counter-clockwise, and according to a wide range of angles. Although the present invention allows the implement (40) to have range of angles of 90° and over, one may choose to restrict the range angle to a value under 45° and use the actuating mechanism of the present invention for its other advantages. Uneven extreme angles with reference to the boom plane (14) are also possible if desired. The actuating mechanism is described in detail further in the text.

The boom

The boom (20) comprises a proximal boom member (22) and a distal boom member (24) operatively connected to each other. The proximal boom member (22) is operatively connected to the vehicle (12) and is rotated by means of a hydraulic actuator (26). The distal boom member (24) is rotated with reference to the proximal boom member (22) by means of a hydraulic actuator (28). Of course, specific construction details are known in the art of heavy machinery.

In addition to the movement in the vertical plane, the boom (20) may be articulated at this proximal end (not shown) for left and right rotations with reference to the vehicle (12). Alternatively, the vehicle (12) may be able to turn on itself, as it is the case for the one illustrated in FIG. 1.

The boom (20) comprises other elements that are described further in the text.

The tree-felling implement

The tree-felling implement (40) itself is a device known in the art. It comprises a main frame (42) on which is located a trunk grabbing means, such as the trunk grabbing arms (44) actuated by the hydraulic actuators (46). The implement further comprises a circular saw and a protective casing (49) therefor. Other tree cutting means, such as a felling shear (not shown) may be used instead of the saw.

The implement pivot (50) is a bearing supporting the weight of the implement (40) and of a tree when one is in the implement (40). It comprises the usual parts for such a bearing, as apparent for a person skilled in the art.

The linking element

The linking element (52) is used for rotatably connecting the implement (40) to the distal end of the distal boom member (24). According to a preferred embodiment, as shown in FIG. 1, the linking element (52) comprises a first pivot (54), for connecting the implement (40) to the boom (20). A second pivot (56) is provided, closer to the frame (42) than the first pivot (54) for rotatably connecting the implement (40) to an end of a first lever (32). The first lever (32) has an opposed end rotatably connected to a hydraulic actuator (30). The same end of the first lever (32) is also rotatably connected to an end of a second lever (34). The second lever (34) has an opposed end rotatably connected to the boom (20). With this arrangement, the linking element (52) is moved in the boom plane (14) whenever the hydraulic actuator (30) is operated, thereby also moving the implement (40) in the boom plane (14).

The actuating mechanism for rotating the implement

Figure 2:
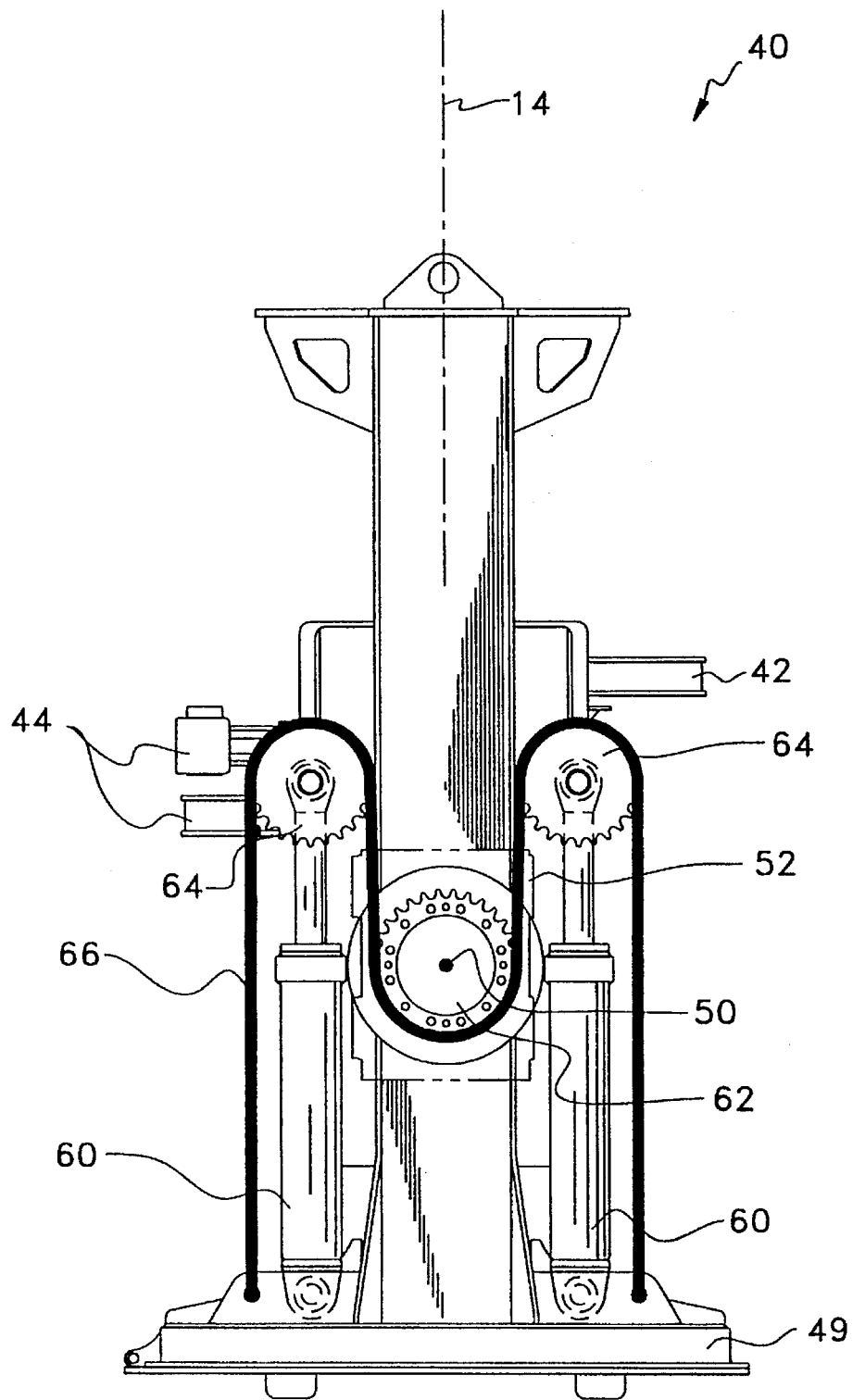
FIG. 2 is a rear view of the implement, showing the implement in a central position with reference to the boom axis.
Figure 3:
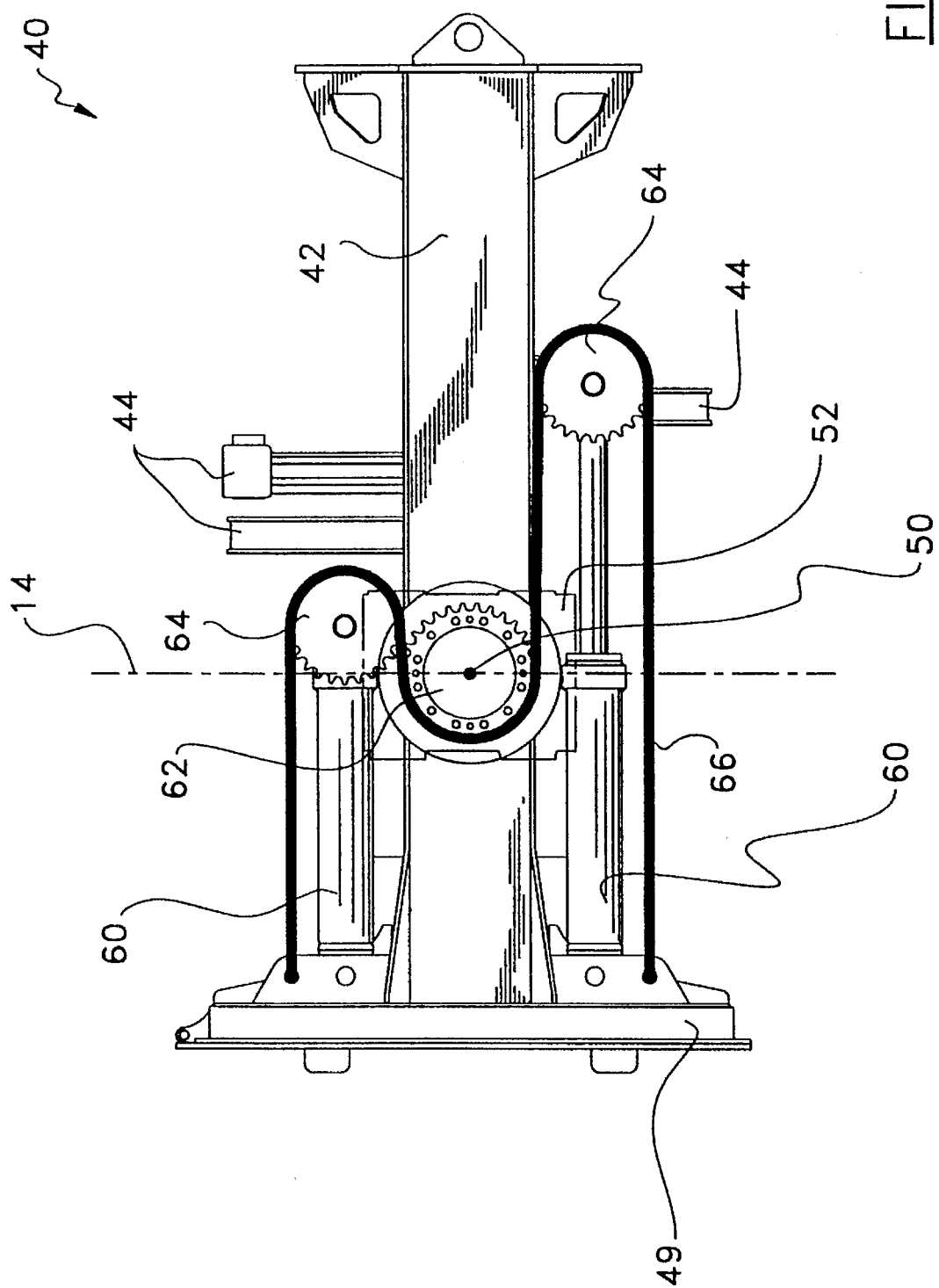
FIG. 3 is an elevational view of the implement shown in FIG. 2, showing the implement in an example of a first extreme angular position.

As best shown in FIGS. 2 and 3, the actuating mechanism comprises a pinion (62) coaxial with the implement pivot (50) and fixed in rotation with reference to the distal end (24) of the boom (20). Two actuators (60), preferably hydraulic, are mounted on the frame (42) and substantially lying in a pinion plane generally defined by the radial direction of the pinion (62). Both actuators (60) are said to extend longitudinally, which means that they are substantially vertical when the implement (40) is generally vertical, like in FIG. 2 for instance.

Each actuator (60) is adjacent to the pinion (62) on a respective side thereof, namely the left and the right, as shown in FIGS. 2 and 3. They each bear a corresponding sprocket (64) substantially coplanar with the pinion plane and rotatably connected to their free end. The sprockets (64) are provided with teeth substantially identical to the ones of the pinion (62).

To link the element together, the mechanism further comprises a chain (66) in mesh with the sprockets (64) and the pinion (62). The chain (66) has ends rigidly attached to the frame (40). FIGS. 2 and 3 illustrate one possible embodiment but different embodiments are possible, as apparent to a person skilled in the art. In the present embodiment, the chain (66) is anchored to the bottom portion of the implement (40), near the casing (49). The chain (66) is run over about half of the left sprocket (64), directed then to be run over about half of the pinion (62) and then run over about half of the right sprocket (64) before being anchored to the bottom portion.

In use, the implement (40) is rotated with reference to the implement pivot (50) by retracting or extending the movable part of one actuator (60) and moving the movable part of the other actuator (60) in the opposite direction. FIG. 3 illustrates an example of a first extreme angular position where the left actuator (60) is fully retracted and the right actuator (60) is fully extended.

Scope of the present description

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What is claimed is:

1. A mechanism for rotating a tree-felling implement, the tree-felling implement comprising a frame rotatably connectable to a distal end of a boom of a logging vehicle by an implement pivot, the boom generally defining a boom plane, the mechanism comprising:

a pinion coaxial with the implement pivot and fixed in rotation with reference to the distal end of the boom, the pinion generally defining a pinion plane;

two longitudinally extending actuators mounted on the frame and substantially lying in the pinion plane, each actuator being adjacent to the pinion on a respective side thereof;

two sprockets substantially coplanar with the pinion plane and respectively rotatably connected to a free end of a corresponding actuator; and a chain in mesh with the sprockets and the pinion, the chain having ends rigidly attached to the frame;

whereby, in use, the implement is rotated as the actuators are operated in opposite directions.

2. A mechanism according to claim 1, wherein the actuator is hydraulic.

3. A tree-felling implement comprising:

a frame;

a connecting means for rotatably connecting the frame at a distal end of a boom of a logging vehicle, the boom generally defining a boom plane and the implement being rotatable around an implement pivot;

a pinion coaxial with the implement pivot and fixed in rotation with reference to the distal end of the boom, the pinion generally defining a pinion plane;

two longitudinally extending actuators mounted on the frame and substantially lying in the pinion plane, each actuator being adjacent to the pinion on a respective side thereof;

two sprockets substantially coplanar with the pinion plane and respectively rotatably connected to a free end of a corresponding actuator; and a chain in mesh with the sprockets and the pinion, the chain having ends rigidly attached to the frame;

whereby, in use, the implement is rotated as the actuators are operated in opposite directions.

4. A mechanism according to claim 3, wherein the actuator is hydraulic.

* * * * *

UNITED STATES PATENT AND TRADEMARK OFFICE
CERTIFICATE OF CORRECTION

PATENT NO. :   5,595,225                           Page 1 of 2

DATED      :   January 21, 1997

INVENTOR(S) :  Gilbert et al.

It is certified that error appears in the above-identified patent and that said Letters Patent is hereby corrected as shown below:

Col. 2, line 8: insert entire page 3 of application (see attached copy)

Signed and Sealed this

Sixth Day of January, 1998

Attest:

BRUCE LEHMAN

*Attesting Officer*                    *Commissioner of Patents and Trademarks* two sprockets substantially coplanar with the pinion plane and respectively rotatably connected to a free end of a corresponding actuator; and a chain in mesh with the sprockets and the pinion, the chain having ends rigidly attached to the frame;

whereby, in use, the implement is rotated as the actuators are operated in opposite directions.

It is also an object of the present invention to provide a tree-felling implement comprising:

a frame;

a connecting means for rotatably connecting the frame at a distal end of a boom of a logging vehicle, the boom generally defining a boom plane and the implement being rotatable around an implement pivot;

a pinion coaxial with the implement pivot and fixed in rotation with reference to the distal end of the boom, the pinion generally defining a pinion plane;

two longitudinally extending actuators mounted on the frame and substantially lying in the pinion plane, each actuator being adjacent to the pinion on a respective side thereof;

two sprockets substantially coplanar with the pinion plane and respectively rotatably connected to a free end of a corresponding actuator; and a chain in mesh with the sprockets and the pinion, the chain having ends rigidly attached to the frame;

whereby, in use, the implement is rotated as the actuators are operated in opposite directions.

A non restrictive description of a preferred embodiment will now be given with reference to the appended drawings.